(12) United States Patent
Watanabe et al.

(10) Patent No.: US 12,005,846 B2
(45) Date of Patent: Jun. 11, 2024

(54) SUPPORT STRUCTURE FOR ONBOARD ELECTRONIC DEVICE ASSEMBLY

(71) Applicant: TOYOTA JIDOSHA KABUSHIKI KAISHA, Toyota (JP)

(72) Inventors: Jumpei Watanabe, Nagakute (JP); Norimasa Koreishi, Miyoshi (JP); Hideo Takeda, Hekinan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/115,325

(22) Filed: Feb. 28, 2023

(65) Prior Publication Data
US 2023/0278510 A1   Sep. 7, 2023

(30) Foreign Application Priority Data
Mar. 2, 2022   (JP) .................................. 2022-031389

(51) Int. Cl.
*B60R 16/023* (2006.01)
(52) U.S. Cl.
CPC ................................ *B60R 16/0239* (2013.01)
(58) Field of Classification Search
CPC ................ B60R 16/02; B60R 16/0239; B60R 2011/0059; B60R 2011/0049; B60K 1/04
See application file for complete search history.

(56) References Cited

U.S. PATENT DOCUMENTS

| 4,252,206 | A | * | 2/1981 | Burkholder | B66F 9/07536 |
| | | | | | 180/68.5 |
| 4,317,497 | A | * | 3/1982 | Alt | H01M 50/209 |
| | | | | | 180/68.5 |
| 4,849,667 | A | * | 7/1989 | Morrill | H02K 15/14 |
| | | | | | 310/91 |
| 8,863,877 | B2 | * | 10/2014 | Saeki | H01M 50/249 |
| | | | | | 180/274 |
| 9,440,593 | B2 | * | 9/2016 | Sakamoto | B60L 50/66 |
| 9,902,334 | B2 | * | 2/2018 | Ando | B60R 11/00 |
| 11,173,855 | B2 | * | 11/2021 | Yuki | H01R 13/6215 |
| 11,919,404 | B2 | * | 3/2024 | Selvaraj | B60K 1/04 |
| 2015/0283955 | A1 | * | 10/2015 | Sakamoto | F16B 5/0258 |
| | | | | | 248/636 |

(Continued)

FOREIGN PATENT DOCUMENTS

| DE | 102014216436 A1 * | 6/2015 | ............ B60L 3/0007 |
| DE | 102015103458 A1 * | 9/2015 | ............. B60R 11/00 |

(Continued)

*Primary Examiner* — Eret C McNichols
(74) *Attorney, Agent, or Firm* — Dinsmore & Shohl LLP

(57) ABSTRACT

The bottom bracket supports the bottom wall of the housing of the electronic device unit. The rear end of the support rod is in contact with the front wall of the housing. The support rod extends from the front wall of the housing to the front of the vehicle. A front bracket supports the front portion of the support rod. The front bracket has a flange and a hook. The flange is secured to the vehicle body in an area adjacent to the support rod in the width direction. The hook is connected to the flange at one end. The hook extends from the vehicle-width side of the support rod across the top surface of the support rod to the opposite side of the vehicle-width side. Furthermore, the hook is free-ended at the other end.

3 Claims, 7 Drawing Sheets

(56) References Cited

U.S. PATENT DOCUMENTS

| | | | | |
|---|---|---|---|---|
| 2016/0176354 A1* | 6/2016 | Ando | ............... | B60K 1/04 |
| | | | | 248/548 |
| 2019/0118634 A1* | 4/2019 | Ito | ............... | B60K 6/26 |
| 2021/0245785 A1 | 8/2021 | Suzuki et al. | | |
| 2023/0299410 A1* | 9/2023 | Sugawara | ............ | H01M 50/249 |
| | | | | 296/203.03 |
| 2023/0322069 A1* | 10/2023 | Kalarasaiah | ............ | F16F 15/04 |
| | | | | 180/68.5 |
| 2023/0331303 A1* | 10/2023 | Yamanashi | ............ | B60K 1/04 |
| 2023/0395838 A1* | 12/2023 | Isoda | ............... | B60K 1/00 |
| 2024/0042842 A1* | 2/2024 | Hisamura | ............... | B60L 50/66 |

FOREIGN PATENT DOCUMENTS

| | | | | |
|---|---|---|---|---|
| DE | 102019119403 A1 * | 1/2020 | ............... | B60K 1/04 |
| JP | 2008-301677 A | 12/2008 | | |
| JP | 2021-123144 A | 8/2021 | | |
| WO | WO-2018179262 A1 * | 10/2018 | ............... | B60R 16/02 |

\* cited by examiner

SUPPORT STRUCTURE FOR ONBOARD ELECTRONIC DEVICE ASSEMBLY

CROSS REFERENCE TO RELATED APPLICATION

This application claims priority to Japanese Patent Application No. 2022-031389, filed on Mar. 2, 2022, which is incorporated herein by reference in its entirety including the specification, claims, drawings, and abstract.

TECHNICAL FIELD

The present disclosure relates to support structures for onboard electronic device assemblies.

BACKGROUND

For example, in JP 2021-123144A, an automatic driving kit (ADK) is installed in a vehicle as an electronic device assembly. For example, the automatic driving kit is a device assembly for function expansion. If an automatic driving kit is installed in a vehicle that is capable of level 2 or level 3 automatic driving, the vehicle will be capable of level 4 or higher automatic driving. For example, an electronic device assembly such as an automatic driving kit is equipped with an electronic device and a housing. The electronics includes a board on which electric circuits are mounted. The housing accommodates the electronics.

Also, in JP 2008-301677A, a battery control assembly is mounted in a vehicle as onboard electronics. The battery control assembly has a board and a housing. The board is mounted with electric circuits. The enclosure houses the board. The battery control assembly is placed on a board. An L-shaped fixing plate (bracket) is in contact with the board and the side of the enclosure of the battery control assembly. Through the L-shaped bracket, the battery control assembly is secured to the board.

By the way, when an electronic device assembly is supported by a vehicle body using a support member such as a bracket, the bracket may be attached to the front wall of the housing of the electronic device assembly. In such a support structure, the electronic device assembly tilts forward during a vehicle frontal collision. On the other hand, if the position of the bracket fastened to the vehicle body is maintained, the front wall of the housing may be broken by the bracket. As a result, the electronics inside the housing may be damaged.

Disclosed herein is a support structure for an onboard electronic device assembly. In this support structure, the front wall of the housing of the electronics assembly is supported by a support member. Furthermore, this support structure can protect the electronics from the support members in the event of a vehicle frontal collision.

SUMMARY

The present disclosure relates to a support structure for a vehicle onboard electronic device assembly. The electronic device assembly has an electronic device and a housing. The housing is a box that houses the electronics. The support structure has a bottom bracket, a support rod, and at least one front bracket. The bottom bracket supports the bottom wall of the housing. The rear end of the support rod is in contact with the front wall of the housing. In addition, the support rod extends from the front wall of the housing toward the front of the vehicle. Each front bracket supports the front portion of the support rod. Each front bracket has a flange and a hook. The flange is secured to the vehicle body in an area adjacent to the support rod in the width direction. One end of the hook is connected to the flange. The hook extends from the vehicle-width side of the support rod across the top surface of the support rod to the opposite side of the support rod. The other end of the hook is the free end.

According to the above configuration, the bottom wall of the housing is supported by the bottom bracket. Therefore, during a frontal collision of a vehicle, the electronics assembly tilts forward. With this forward tilt, the rear ends of the support rods are urged downward, and thereby the front portions of the support rods are urged upward. At this time, the forward portion of the support rod expands the hooks of the respective front brackets. As a result, the support rod can be detached from the respective front bracket. Since the support rods are released from the front brackets in accordance with the forward tilt of the electronic device assembly, damage to the electronic device assembly by the support rods is suppressed.

In the above configuration, at least one front bracket may have a first front bracket and a second front bracket. In this case, the support rod is positioned between the flange of the first front bracket and the flange of the second bracket.

According to the above configuration, the support rods can be supported by the vehicle body from both sides.

In the above configuration, the hook of each front bracket may be provided with a joint point to be joined to the support rod.

When the electronic device assembly tilts forward during a vehicle frontal collision, the support rod is pushed in the forward direction. At this time, a shear load is applied to the joint point, which causes the joint point to rupture. As a result, the support bar can move forward against the bar bracket.

According to the support structure for onboard electronic device assemblies disclosed herein, the front wall of the housing of the electronic device assembly is supported by a support member. In such a support structure, the electronic device can be protected from the support member in the event of a frontal collision of a vehicle.

DESCRIPTION OF EMBODIMENTS

Below, the support structure of the onboard electronic device assembly will be described using the drawings. The shapes, materials, numbers, and values described below are examples for illustrative purposes. The shapes, materials, number of pieces, and numerical values described below can be changed as necessary according to the specifications of the electronic device assembly and support structure. In addition, the same symbols are attached to equivalent elements in all drawings below.

In FIG. 1-FIG. 7, a Cartesian coordinate system is used to represent the position and direction of each configuration. This Cartesian coordinate system has FR, RW, and UP axes. The FR axis is the vehicle front/rear axis with the forward direction; the RW axis is the vehicle width axis with the right side direction; and the UP axis is the vehicle vertical axis with the upward direction.

Figure 1:
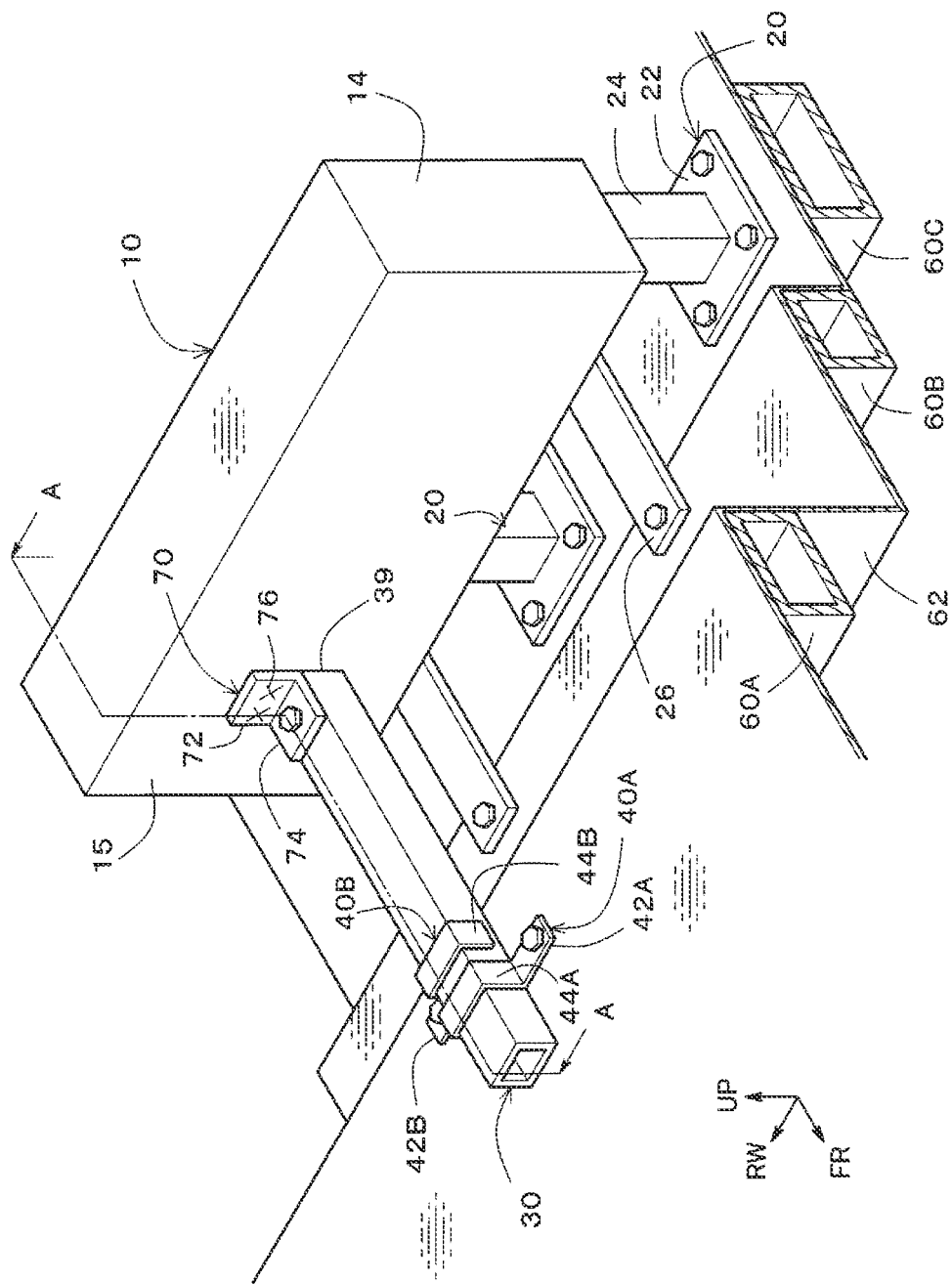
FIG. 1 is a diagram illustrating the onboard electronic device assembly and its support structure.

FIG. 1 illustrates the onboard electronics assembly 10 and the support structure of the electronics assembly 10. This support structure has a bottom bracket 20, a support rod 30, a first front bracket 40A, and a second front bracket 40B.

FIG. 1 shows a plurality of cross members 60A, 60B, 60C and a floor panel 62 are illustrated. Floor panel 62 is a floor panel of the vehicle. The floor panel 62 is composed of, for example, an aluminum plate. The structure of the interior of the vehicle is illustrated in FIG. 1. As shown in this figure, the floor panel 62 has a multi-stage structure with multiple levels of different heights.

For example, the vehicle is a bus or other passenger vehicle. The rear portion (FR axis negative portion) of FIG. 1 is a space for passengers. The front portion is the driver's space. By making the passenger space a so-called low-floor area, the ease of getting on and off the vehicle is improved.

Also, in the driver's space, the ground level of the floor panel 62 is relatively high. Therefore, in the driver's seat space, a space is created below the floor panel 62. This space can accommodate relatively large equipment such as vehicle drive system equipment.

Floor panel 62 is supported by a plurality of cross members 60A, 60B, and 60C. Each cross member 60A, 60B, 60C are frame members extending in the vehicle width direction. The ends of each cross member 60A, 60B, 60C are connected to, for example, rockers (not shown), which are also frame members.

Each of the cross members 60A, 60B, 60C are equipped with a closed cross-section structure. For example, each cross member 60A, 60B, 60C are square cylindrical members. Each cross member 60A, 60B is installed at a step in the floor panel 62. Cross member 60C is installed in the forward portion of the passenger space. Cross member 60C is installed under floor panel 62.

Figure 2:
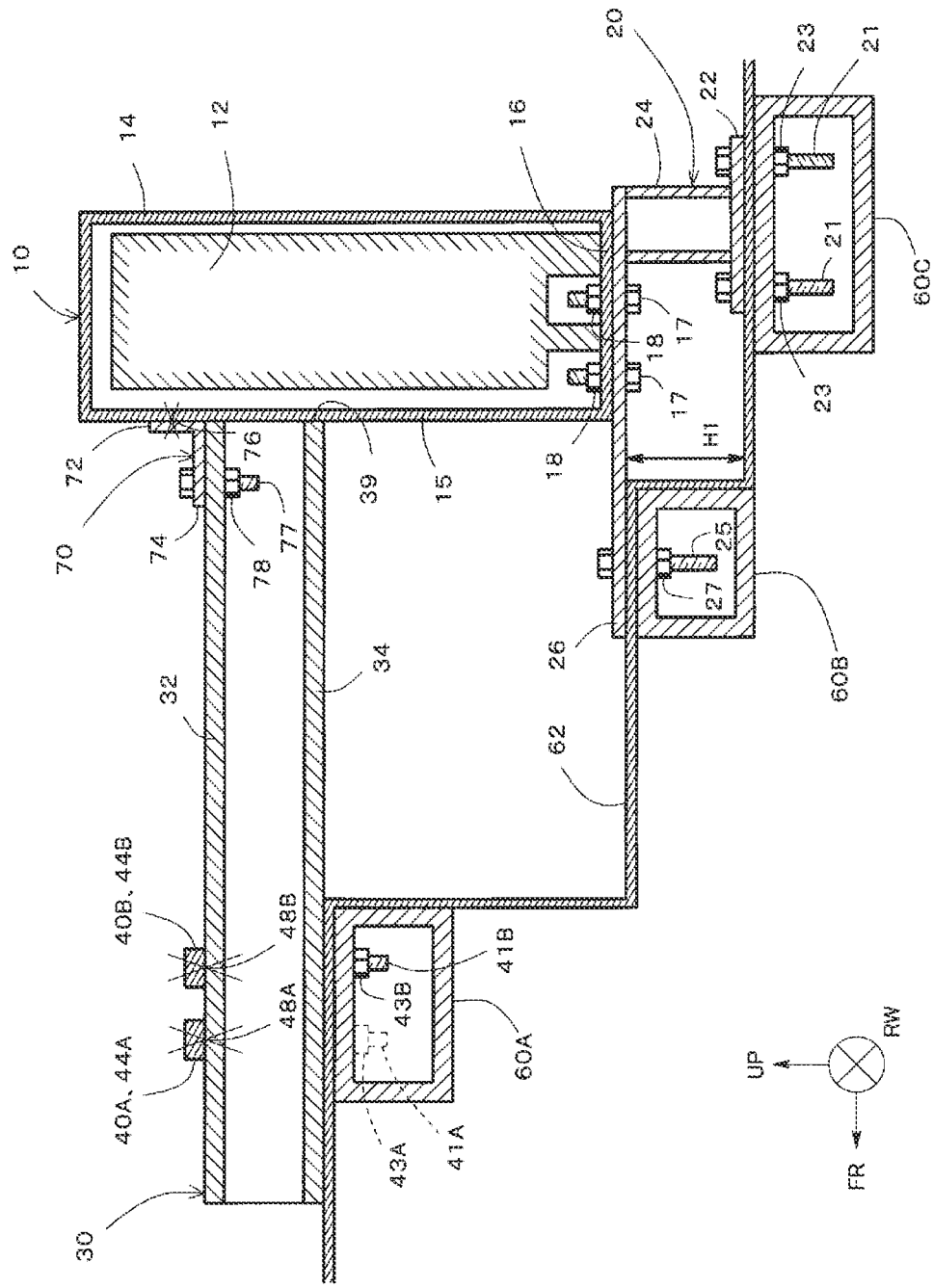
FIG. 2 is a side cross-sectional view illustrating the A-A section of FIG. 1.

As illustrated in FIGS. 1 and 2, onboard electronics assembly 10 is provided on floor panel 62. The electronics assembly 10 has a housing 14. The housing 14 houses the electronic device 12. The electronics assembly 10 may be, for example, the automated driving kit (ADK) described above.

For example, as illustrated in FIG. 1, the electronics assembly 10 is rectangular in shape. This rectangular body has its longitudinal direction in the width direction of the car. The electronic device assembly 10 is placed at the front end of the passenger space in the cabin.

The electronic device 12 enable, for example, automatic operation of a vehicle at level 4 or higher. A circuit is implemented in the electronic device 12. This circuitry acquires measurements, for example, from on-board sensors. Based on these measurements, the circuitry acquires information about the environment around the vehicle, the vehicle's attitude, behavior, and position. Furthermore, the circuit sends commands to the drive and steering systems.

The housing 14 is a box that houses the electronic device 12. For example, the housing 14 is composed of a member with a predetermined rigidity. For example, the housing 14 is constructed from steel. As will be described below, the housing 14 is supported by the vehicle body (a plurality of cross members 60A, 60B, 60C). The support members include a bottom bracket 20, a support rod 30, a first front bracket 40A, and a second front bracket 40B.

Referring to FIGS. 1 and 2, the bottom wall 16 of housing 14 is supported by bottom bracket 20. For example, the bottom bracket 20 is an L-shaped member. The bottom bracket 20 has a flange 22, a pillar 24, and a seat plate 26. Depending on the dimensions of the electronics assembly 10, a plurality of bottom brackets 20 are provided on the vehicle. For example, as illustrated in FIG. 1, a pair of bottom brackets 20, 20 are placed on the floor panel 62. The pair of bottom brackets 20, 20 are spaced apart in the width direction of the vehicle.

Flange 22 is provided on cross member 60C. Fastening holes (not shown) are provided in flange 22, floor panel 62, and cross member 60C. These plurality of fastening holes are axially aligned, and furthermore, bolts 21 are screwed into these plurality of fastening holes. A nut 23 coaxial to the fastening holes is provided on the upper inner surface of the cross member 60C. The nut 23 is, for example, a weld nut. This nut 23 is screwed with the bolt 21.

Figure 5:
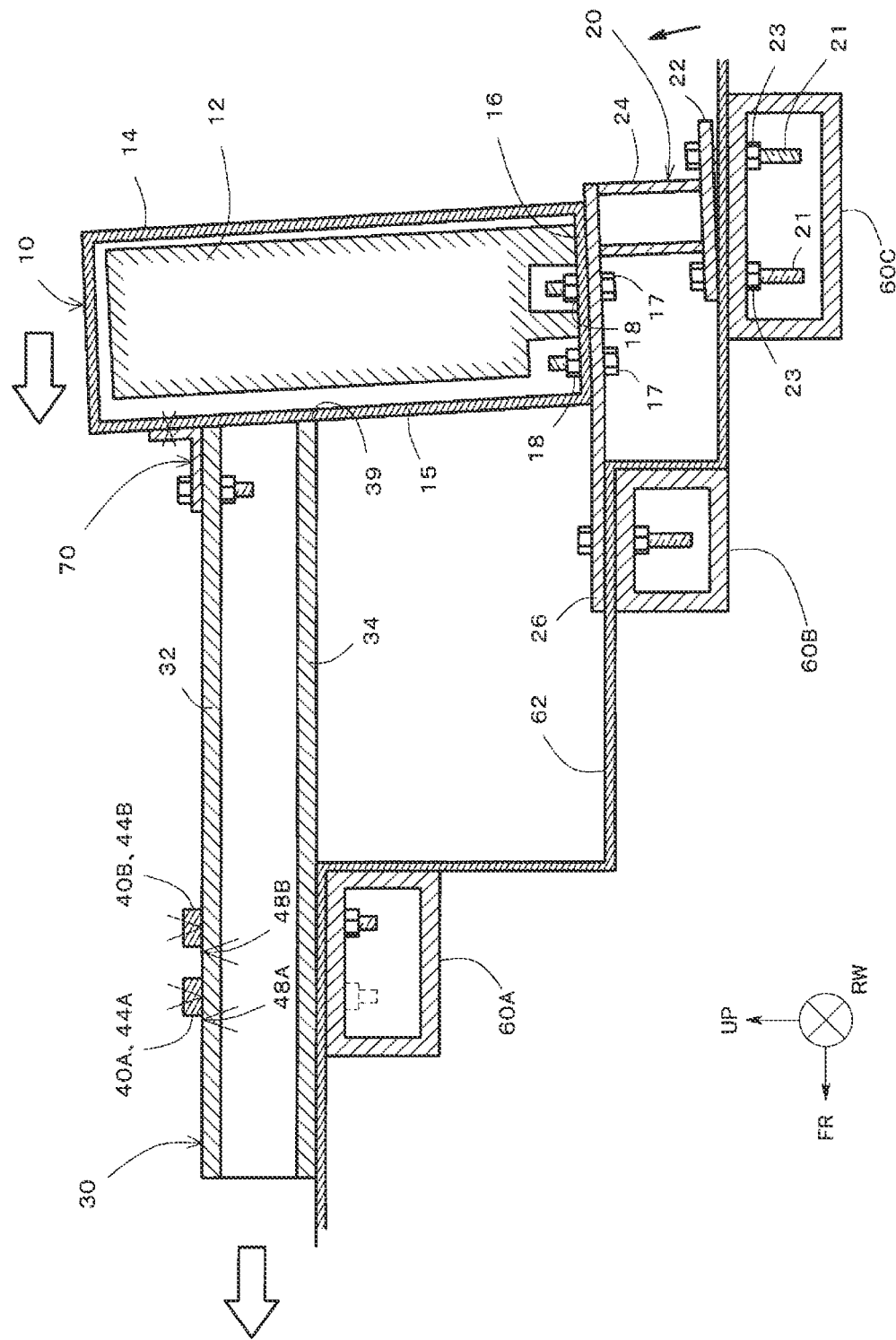
FIG. 5 illustrates the behavior of the electronics assembly and its support structure during a vehicle frontal collision (2/4).

As shown in FIG. 5 below, in the event of a frontal vehicle collision, in order to prevent damage to the housing 14, the electronics assembly 10 is tilted forward and the bolt 21 is lifted. This lifting causes the bolt 21 to partially detach from the cross member 60C (the bolt 21 is pulled out). Here, the axial length of bolt 21 is determined to be long enough to prevent the bolt 21 from completely detaching from the cross member 60C. The axial length of bolt 21 is determined so that it is long enough to prevent the bolt 21 from completely pulling out of the cross member 60C. For example, the axial length of bolt 21 is determined to be at least half the height of the interior space of cross member 60C.

The yield capacity of the bolts 21 is defined for the protection of the housing 14. The bottom wall 16 of housing 14 has a defined yield capacity for out-of-plane loads. The yield capacity of the bolt 21 is determined to be less than the yield capacity of the bottom wall 16. In other words, when the electronic device assembly 10 tilts forward, the bolts 21 and nuts 23 stop the forward tilt. As a reaction force, the bottom wall 16 of the housing 14 is subjected to an out-of-plane load (e.g., in the direction of the UP axis) from the bolts 17 and nuts 18. If this out-of-plane load exceeds the yield capacity of the bottom wall 16, the bottom wall 16 is plastically deformed. Therefore, in this support structure, before the out-of-plane load on the bottom wall 16 reaches the yield capacity, the threads, for example, of the bolts 21 are plastically deformed and the bolts 21 pulls out from the nut 23.

Referring to FIG. 2, the bottom bracket 20 is provided with a pillar 24. The pillar 24 is provided standing up from the flange 22. The height dimension of the column 24 is determined to be equal to the step height H1 formed by the cross member 60B. H1 formed by the cross member 60B. The column 24 may be, for example, a square cylindrical member.

The rear end of the seat plate 26 is connected to the upper end of the pillar 24. The seat plate 26 extends forward from the rear end. The front end of the seat plate 26 is positioned on the cross member 60B. The front end of the seat plate 26, the floor panel 62, and the cross member 60B each have fastening holes not shown. Bolts 25 are screwed into these fastening holes. A nut 27 coaxial to the fastening holes is provided on the upper inner surface of the cross member 60B. Nut 27 is, for example, a weld nut. The nut 27 is screwed with the bolt 25.

The electronics assembly 10 is placed on the seat plate 26 of the bottom bracket 20. Each of the bottom wall 16 and the seat plate 26 of the housing 14 is provided with fastening holes not shown. A bolt 17 is screwed into these fastening holes. A nut 18 is provided on the inner surface of the bottom wall 16 of the housing 14. The nut 18 is, for example, a weld nut. The nut 18 is screwed with the bolt 17.

The front wall 15 of the housing 14 is supported by the support rod 30, the first front bracket 40A, and the second front bracket 40B to the vehicle body (cross member 60A). Referring to FIG. 2, for example, the front wall 15 of the housing 14, a portion slightly above the center of the housing 14 in the height direction and the support rod 30 are is in contact with, for example, a portion of the front wall 15 of the housing 14 slightly above the center of the height direction.

The support rod 30 is, for example, a square cylindrical member, having a top plate 32, side plates 36, 38, and a bottom plate 34. The rear end 39 of the support rod 30 is in contact with the front wall 15 of the housing 14. The support rod 30 extends from the rear end 39 to the front of the vehicle. The front end of the support rod 30 extends forward of the cross member 60A.

Referring to FIGS. 1 and 2, the front wall 15 of housing 14 is supported on support rod 30 via L-shaped bracket 70 which is an L-shaped member in side view. The L-shaped bracket 70 has a vertical plate 72 and a horizontal plate 74, the vertical plate 72 of the L-shaped bracket 70 and the front wall 15 are joined, for example, by welding. For example, the vertical plate 72 and the front wall 15 have a joint point 76.

The L-shaped bracket 70 and the support rod 30 are bolted together. Each of the horizontal plate 74 and the top plate 32 of the support rod 30 has fastening holes not shown. A bolt 77 is screwed into these fastening holes. A nut 78 is provided on the inner surface of the top plate 32 of the support rod 30. The nut 78 is, for example, a weld nut. The nut 78 is screwed with the bolt 77.

Figure 3:
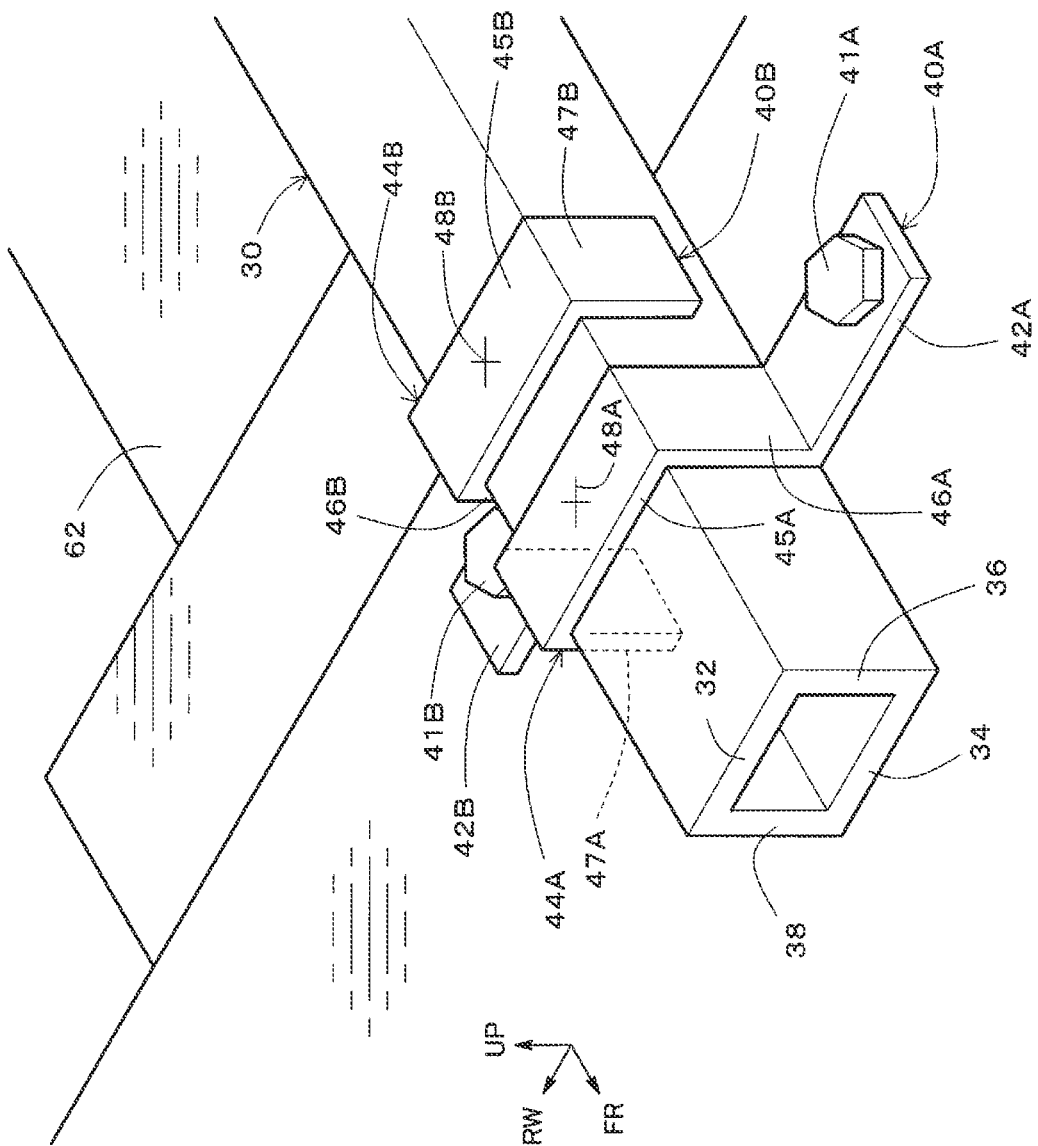
FIG. 3 is an enlarged diagram illustrating the structure around the front bracket.

The forward portion of the support rod 30 is supported by a pair of brackets 40A, 40B on the vehicle body (cross member 60A). As illustrated in FIG. 3, the first front bracket 40A has a flange 42A and a hook 44A. The second front bracket 40B has flange 42B and hook 44B.

Flanges 42A and 42B, respectively, are adjacent to the support rod 30 in the width direction. In the region, they are fixed to the vehicle body. This vehicle body is, for example, the cross member 60A. As illustrated in FIGS. 2 and 3, each of the flanges 42A, 42B and the cross member 60A, for example, has a member 60A are each provided with fastening holes, which are not shown in the figure. Bolts 41A and 41B are screwed into these fastening holes. In FIG. 2, bolt 41A and nut 43A are shown in the A-A section, the bolt 41A and nut 43A are shown in dashed lines. Referring to FIG. 2, a plurality of nuts 43A, 43B are provided on the inner surface of the upper plate of cross member 60A. The plurality of nuts 43A, 43B are weld nuts, for example. Nut 43A is screwed to bolt 41A. Nut 43B is screwed with bolt 41B.

The hook 44A is connected to the flange 42A at one end (integrally fixed). The hook 44B is connected (integrally fixed) to the flange 42B at one end. Each of the hooks 44A, 44B is connected to the support rod 30 from the side of the support rod 30 in the vehicle width direction to the opposite side across the top surface of the support rod 30. Furthermore, the other end of each of the hooks 44A, 44B is a free end.

The hook 44A has a side plate 46A, an upper plate 45A, and a side plate 47A. Hook 44B has a side plate 46B, an upper plate 45B, and a side plate 47B. Side plate 46A is connected to flange 42A at its lower end. Furthermore, side plate 46A is extended upward along side plate 36 of support rod 30. Side plate 46B is connected at its lower end to flange 42B. Further side plate 46B is extended upward along side plate 38 of support rod 30. The upper plates 45A, 45B are placed on the top plate 32 on the support rod 30, and the upper plates 45A, 45B are extended in the vehicle width direction. Furthermore, the side plate 47A is extended downwardly along side plate 38 of support rod 30. The lower end of side plate 47A is a free end. Side plate 47B is extended downward along side plate 36 of support rod 30. The lower end of side plate 47B is a free end. For example, the height of each of the side plates 47A, 47B is less than a height of the side plates 36, 38.

The respective hooks 44A, 44B and the support rod 30 are joined by welding, for example. For example, the upper plate 45A of the hook 44A has a joint point 48A for joining with the top plate 32 of the support rod 30. The upper plate 45B of the hook 44B has a joint point 48B for joining with the top plate 32 of the support rod 30.

The support rod 30 is also positioned between flanges 42A and 42B. For example, flange 42A is provided on the inside side of the support rod 30 in the vehicle width direction, and flange 42B is provided on the outer side of the support rod 30 in the vehicle width direction.

Therefore, the hook 44A is extended outward from the inside in the direction of the vehicle width starting from the connection with the flange 42A. The hook 44B is extended inward from the outside in the direction of the vehicle width starting from the connection with the flange 42B. In other words, the hook 44A extends from the flange 42A to the side plate 36, top plate 32, and side plate 38 of support rod 30. On the other hand, hook 44B extends from flange 42B to cover side plate 38, top plate 32, and side plate 36 of support rod 30.

Thus, the cantilevered structure of the first front bracket 40A and the second front bracket 40B are alternately engaged to the support rod 30. As a result, the support rod 30 is supported by the cross member 60A (see FIG. 2) on both sides in the vehicle width direction.

State of Frontal Collision of Vehicle

FIGS. 4-7 illustrate the behavior of the electronics assembly 10 and its support structure during a frontal collision (frontal crash) of a vehicle. During a frontal collision of a vehicle, the electronic device assembly 10, whose bottom part is supported by the bottom bracket 20, is subjected to a load that causes it to tilt forward.

Figure 4:
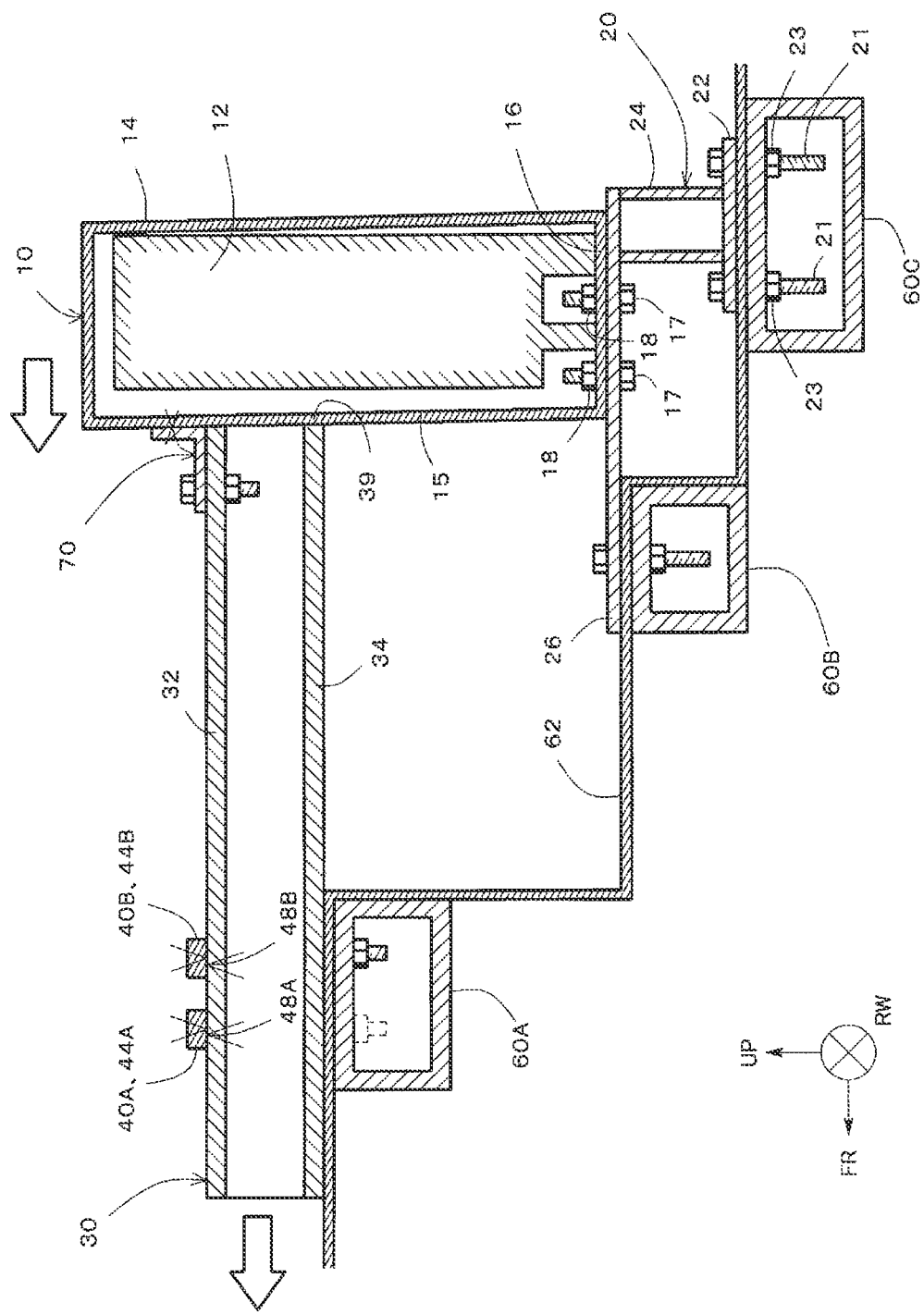
FIG. 4 illustrates the behavior of the electronics assembly and its support structure during a vehicle frontal collision (1/4).

When the housing 14 is elastically deformed by this load, the support rod 30 is applied forward. With this force, a shear load is input to the joint points 48A, 48B. This shear load causes the joint points 48A, 48B to break as illustrated in FIG. 4. This allows the support rod 30 to move forward relative to the front brackets 40A, 40B. The support rod 30 can be moved forward relative to the front brackets 40A, 40B.

As the forward tilt of the electronics assembly 10 progresses further, the threads and thread grooves of the bolt 21 and nut 23 are destroyed, and the bolt 21 begins to pull out of the nut 23, as illustrated in FIG. 5, the bolt 21 begins to pull out of the nut 23, as illustrated in FIG. 5.

Figure 6:
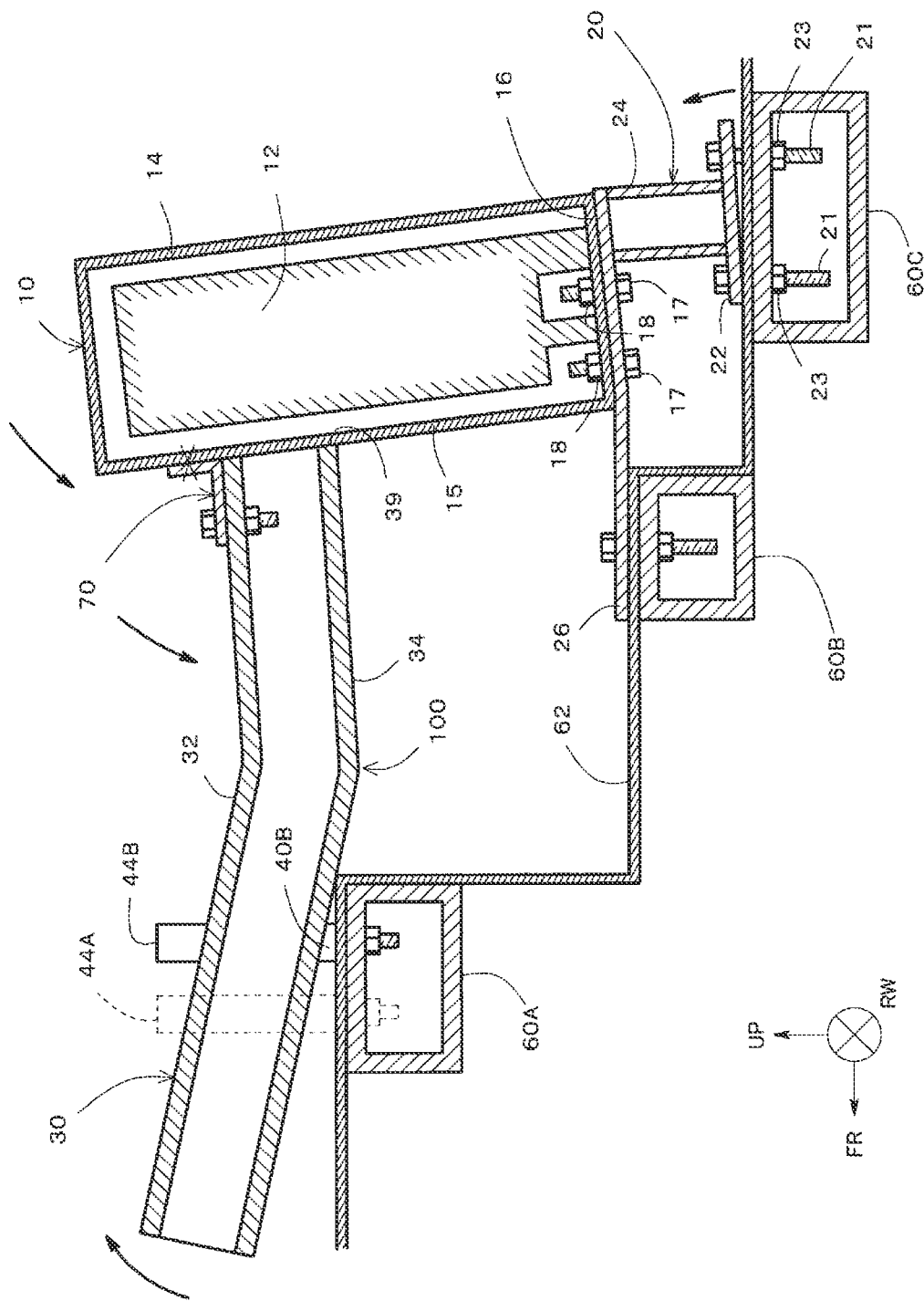
FIG. 6 illustrates the behavior of the electronics assembly and its support structure during a vehicle frontal collision (3/4).

As the forward tilt of the electronics assembly 10 is further advanced, the rear portion of the support rod 30 is applied downward. As illustrated in FIG. 6, this causes the support rod 30 to buckle with the rear portion behind the cross member 60A as the inflection point 100 as shown in FIG. 6. At this time, the forward portion of the support bar 30 is urged upward.

Figure 7:
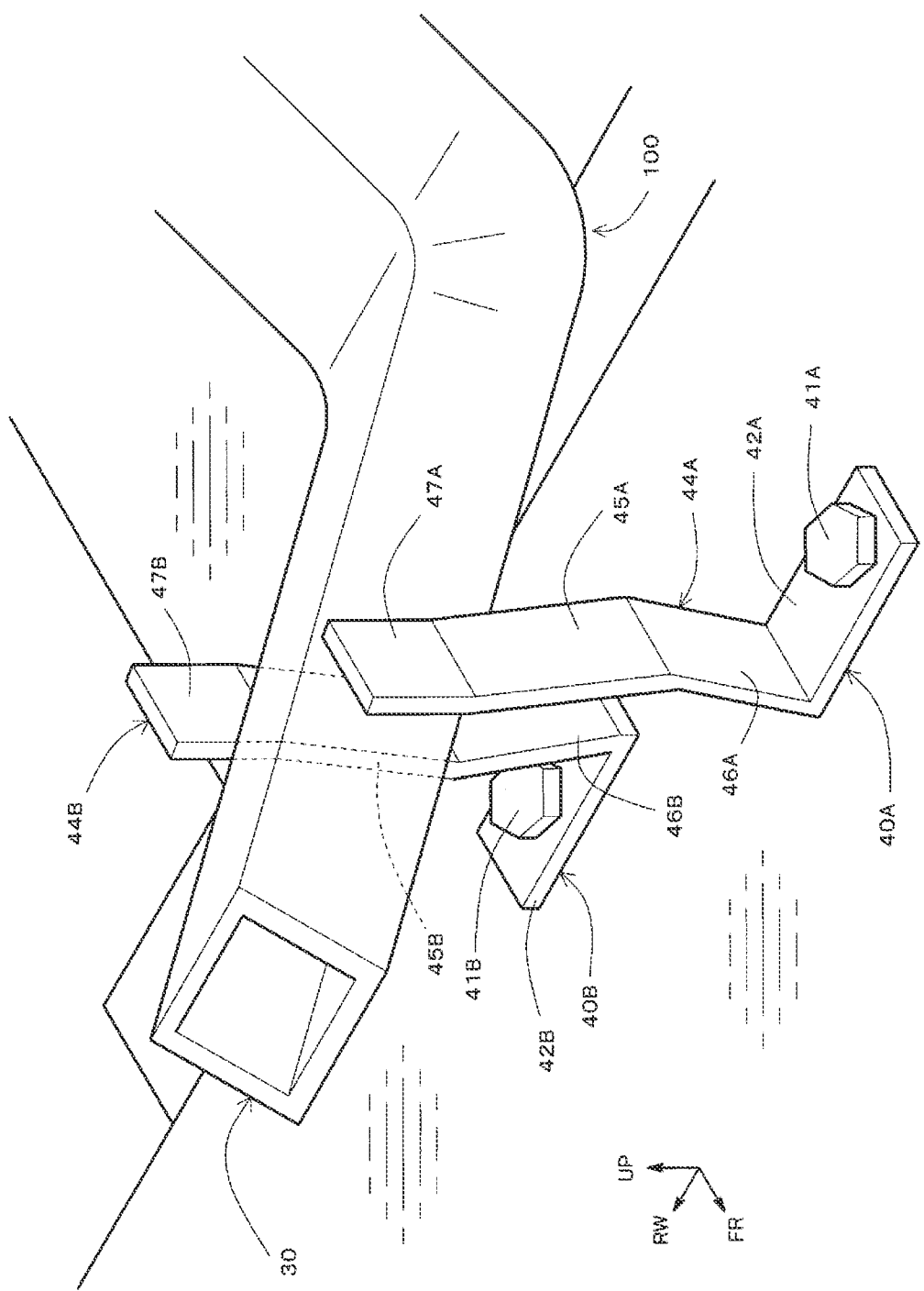
FIG. 7 illustrates the behavior of the electronics assembly and its support structure during a vehicle frontal collision (4/4).

As the front portion of the support rod 30 is applied upward, as illustrated in FIG. 7, the hook 40A of the first front bracket 40A is deployed as illustrated in FIG. 7. The hook 44B on the second front bracket 40B is also deployed. For example, the upper plate 45A and side plate 47A of hook 44A are bent upward. The upper plate 45B and side plate 47B of the hook 44B are also bent upward. As the hooks 44A and 44B are deployed, the front portion of the support rod 30 can move upward. The front part of the support rod 30 can be moved upward.

Thus, according to the support structure of the onboard electronic device assembly, during a frontal collision of the vehicle, the joint points 48A, 48B are ruptured. This allows the support rod 30 to move forward. Furthermore, the support rod 30 deploys the hooks 44A, 44B. This allows the support rod 30 to move upward. As a result, damage to the electronics assembly 10 contacting the rear end 39 of the support rod 30 is inhibited.

The present disclosure is not limited to the present embodiments described above, and includes all changes and modifications without departing from the present disclosure is not limited the present embodiments described above and includes all changes and modifications without departing from the technical scope or the essence of the present disclosure defined by the claims.

The invention claimed is:

1. A support structure for an onboard electronic device unit of a vehicle, the onboard electronic device unit having an electronic device and a hosing, the housing being a box housing the electronic device, the support structure comprising:
   a bottom bracket supporting a bottom wall of the housing;
   a support rod, a rear end of the support rod being in contact with a front wall of the housing, the support rod extending from the front wall towards the front of the vehicle; and
   at least one front bracket supporting a front portion of the support rod,
   wherein each of the at least one front bracket has a flange and a hook,
   wherein the flange is secured to a vehicle body in an area adjacent to the support rod in a vehicle-width direction, and
   wherein one end of the hook joins the flange, the hook extends from a vehicle-width side of the support rod across a top surface of the support rod to the opposite side of the support rod, and the other end of the hook is a free end.

2. The support structure according to claim 1,
   wherein the at least one front bracket comprises a first front bracket and a second front bracket, and
   wherein the support rod is disposed between the flange of the first front bracket and the flange of the second front bracket.

3. The support structure according to claim 2, wherein each hook of the first front bracket and the second front bracket is provided with a joint point joined with the support rod.

* * * * *